United States Patent
Le et al.

(10) Patent No.: US 6,785,259 B2
(45) Date of Patent: Aug. 31, 2004

(54) ENHANCED TRANSMISSION OF CRITICAL DATA

(75) Inventors: Khiem Le, Coppell, TX (US); Yogesh Swami, Irving, TX (US); Naveen K. Kakani, Denton, TX (US)

(73) Assignee: Nokia Corporation, Espoo (FI)

( * ) Notice: Subject to any disclaimer, the term of this patent is extended or adjusted under 35 U.S.C. 154(b) by 201 days.

(21) Appl. No.: 09/991,543

(22) Filed: Nov. 16, 2001

(65) Prior Publication Data

US 2003/0095535 A1 May 22, 2003

(51) Int. Cl.[7] .................................................. H04J 3/24
(52) U.S. Cl. ...................................... 370/349; 370/352
(58) Field of Search ................................ 370/229, 235, 370/310, 310.1, 310.2, 328, 332, 333, 349, 352–356, 358, 386, 389, 392

(56) References Cited

U.S. PATENT DOCUMENTS

| | | | |
|---|---|---|---|
| 5,684,791 A | * 11/1997 | Raychaudhuri et al. | 370/310.2 |
| 5,926,468 A | 7/1999 | Chapman et al. | |
| 6,208,620 B1 | 3/2001 | Sen et al. | 370/231 |

FOREIGN PATENT DOCUMENTS

EP  1168730  1/2002

OTHER PUBLICATIONS

"A Comparison of Mechanisms for Improving TCP Performance Over Wireless Links", H. Balakrishnan et al, *Proc. ACM SIGCOMM '96*, Stanford CA, Aug. 1996, pp. 1–14.
"TCP Performance Issues Over Wireless Links", G. Xylomenos et al, *IEEE Communications Magazine*, Apr. 2001, pp. 52–58.
"Implementation of Indirect TCP", A. Bakre et al, *IEEE Transactions on Computers*, vol. 46, No. 3, Mar. 1997, pp. 260–278.

* cited by examiner

Primary Examiner—Wellington Chin
Assistant Examiner—Brenda Pham

(57) ABSTRACT

The link layer (68, 64) of the sending end of a wireless link (66) is enhanced (10, 74) by providing a mechanism for discriminating (36, 38; 79, 82) between special, critical or otherwise important packets from among a plurality of packets send over the wireless link. Special link layer treatment (42; 89) is accorded to such special, critical or otherwise important packets, while the remaining packets are subjected to normal link layer treatment (44; 86) before transmission over the wireless link.

14 Claims, 4 Drawing Sheets

ENHANCED TRANSMISSION OF CRITICAL DATA

TECHNICAL FIELD

The present invention relates to packet networks and, more particularly, improved transport layer performance over wireless links.

DISCUSSION OF RELATED ART

As pointed out by A. V. Bakre et al in "Implementation and Performance Evaluation of Indirect TCP" *IEEE Transactions on Computers*, Vol. 46, No. 3, March 1997 at pp. 260–278, wireless links are slower and less reliable compared to wired links and consequently the use of existing network protocols, which were developed mainly for the high bandwidth and faster wired links, will create unique performance problems arising from host mobility and due to the characteristics of the wireless medium. An indirect protocol model was proposed by Bakre et al so that whenever an interaction between two IP hosts on an internetwork, such as between a mobile host and a stationary host, involves communication over two drastically different kinds of media (e.g., wireless and wired), the interaction is split into two separate interactions—one for each kind of communication medium. A fixed network protocol such as TCP is used for communication between the fixed host and a mobility support router (base station) and a wireless protocol (e.g., wireless TCP) for communication between the mobile host and the mobility support router (see Section 3 "Indirect Protocols" at pp. 261–2). The protocol stack is split at the mobility support router in order to enable the taking of corrective measures to address the change in the environment from wired to wireless.

A criticism of this approach is some resulting performance issues. Every packet incurs the overhead of going through TCP protocol processing twice at the base station, although extra copies are avoided by an efficient implementation. Another disadvantage of this approach is that the end-to-end semantics of TCP acknowledgements is violated, since acknowledgements to packets can now reach the source even before the packets actually reach the mobile host. Also, since this protocol maintains a significant amount of state at the base station per TCP connection, handoff procedures tend to be complicated and slow. These problems are described in detail in the article "A Comparison of Mechanisms for Improving TCP Performance Over Wireless Links" by H. Balakrishnan et al appearing in *Proc. ACM SIGCOMM '96*, August 1996 and also in the more recent article "TCP Performance Issues over Wireless Links" by G. Xylomenos et al, *IEEE Communications*, April 2001.

DISCLOSURE OF INVENTION

An object of the present invention is to optimize throughput of applications transmitted over a wireless link interfacing with other, non-wireless links.

According to a first aspect of the invention, a method for use in a packet-based communication between two end points in a communication network during which a plurality of packets are communicated at least in part over a wireless link is characterized by identifying or recognizing a packet as a special packet at an end point of the wireless link, and by applying special treatment to the special packet at the end point of the wireless link to ensure reliable transmission over the wireless link.

Further according to the first aspect of the invention, the special treatment is applied at a link layer of the end point of the wireless link.

Further still according to the first aspect of the invention, the end point of the wireless link comprises a sending endpoint for sending the plurality of packets over the wireless link. The special treatment may be applied at a link layer of the sending end point of the wireless link.

Still in accord with the first aspect of the present invention, the identifying or recognizing comprises identifying the special packet at an application layer of the endpoint and by notifying a link layer of the endpoint for applying the special treatment to the identified special packet at the link layer.

Still further in accord with the first aspect of the invention, the identifying or recognizing comprises recognizing the special packet at a link layer of the endpoint and by controlling the link layer of the endpoint for applying the special treatment to the special packet at the link layer. Further yet in accord with the first aspect of the invention, the recognizing comprises recognizing the special packet by timing arrivals of packets having a same characteristic code associated therewith and identifying a packet having the code arriving a selected period after arrival of a last packet having the code as the special packet.

According to a second aspect of the invention, a device for use in a packet-based communication between two end points in a communication network during which a plurality of packets are communicated at least in part over a wireless link is characterized by means for identifying or recognizing a packet as a special packet at an end point of the wireless link, and by means for applying special treatment to the special packet at the end point of the wireless link to ensure reliable transmission over the wireless link.

Further according to the second aspect of the invention, the special treatment is applied at a link layer of the end point of the wireless link.

Further still according to the second aspect of the invention, the end point of the wireless link comprises a sending endpoint for sending the plurality of packets over the wireless link. As mentioned above, the special treatment may be applied at a link layer of the sending end point of the wireless link.

Still in accord with the second aspect of the present invention, the identifying or recognizing comprises identifying the special packet at an application layer of the endpoint and by notifying a link layer of the endpoint for applying the special treatment to the identified special packet at the link layer.

Still further in accord with the second aspect of the invention, the identifying or recognizing comprises recognizing the special packet at a link layer of the endpoint and by controlling the link layer of the endpoint for applying the special treatment to the special packet at the link layer.

Further yet in accord with the second aspect of the invention, the recognizing comprises recognizing the special packet by timing arrivals of packets having a same characteristic code associated therewith and identifying a packet having the code arriving a selected period after arrival of a last packet having the code as the special packet.

According to a third aspect of the invention, a system having a pair of hosts communicating packets in an end-to-end application over communication links including wireless links, each wireless link having a mobile host at one end and an access network at another end, is characterized by an enhancement in a link layer at an end of the wireless link for providing special link layer treatment to a packet identified as a special packet for ensuring reliable transmission of the special packet over the wireless link.

Further according to the third aspect of the invention, the application identifies the special packet as special to the link layer when providing the special treatment at an end of the wireless link co-located with the application.

According still further to the third aspect of the invention, the link layer inspects the packets for identifying the special packet when the link layer is providing the special treatment at an end of the wireless link not co-located with the application.

Further still according to the third aspect of the invention, the enhancement is characterized by means for identifying or recognizing the special packet at an endpoint of the wireless link, and by means for applying the special link layer treatment to the special packet at the end. The end of the wireless link may comprise a sending end for sending the packets over the wireless link.

As compared to the snoop TCP mechanism discussed in the above-mentioned articles, the present invention does not require any caching of TCP data, and does not manipulate the original TCP messages (i.e., there is no hiding of duplicate acknowledgements and no TCP-level retransmission by the snooping entity). The present invention relies on link and physical layer special treatment, which can include link level retransmissions that are more efficient than TCP level retransmissions.

As compared to splitting the original TCP connection into separate connections for the wired and wireless parts of the path and using performance enhancing proxies, the present invention does not suffer from the drawbacks of violation of the end-to-end TCP semantics (acknowledgements reaching the sender before the data reaches the destination), overhead caused by back-to-back processing, and considerable per-connection state maintenance.

The advantages of the present invention also include link level and/or physical level special treatment providing faster recovery than application or transport level retransmission. In addition, for some application protocols such as TCP, it is very beneficial to avoid going into a timeout, since recovery from a timeout is very costly to the throughput. Another advantage of the present invention is that no modification to the application protocol (e.g., TCP) is required. The end-to-end principle and semantics of the application (e.g., TCP) is preserved. There is no need to cache TCP data. Some parts of the invention assume an enhancement in the network, but it is internal to the access network. A proprietary solution is conceivable within the access network, such as the Radio Access Network (RAN) of the Third Generation Partnership Project (3GPP). So another advantage is that no modification to existing air interface protocols (e.g., EDGE, WCDMA, CDMA 2000) is required.

Although parts of the invention require snooping of the application traffic by the network, other parts, which do not require snooping, can be applied independently. Some parts of the invention require state information to be maintained in the network. However, no major scalability problem is expected, because unlike the backbone network, the number of connections is relatively small, due to the radio link limitations. The per-connection state information to be maintained is also limited. Note again that the other aspects of the invention can be applied independently.

In other words, modifications internal to the mobile terminal can be implemented by themselves for special treatment of critical messages coming from the terminal, such as SYN and Sparse ACKs. In the access network, modifications may be needed for special treatment of critical messages coming from the remote TCP endpoint, such as ACK to SYN and Sparse ACKs. If the snooping entity and the link level are not co-located, some interfaces may be impacted. However, since an access network is in practice likely from the same supplier, a proprietary implementation is possible. Note that a partial benefit can be independently gained by modification internal to the mobile terminal alone by improving the chance of SYN and Sparse ACK successful delivery.

These and other objects, features and advantages of the present invention will become more apparent in light of the following detailed description of a best mode embodiment thereof, as illustrated in the accompanying drawing.

BEST MODE FOR CARRYING OUT THE INVENTION

Figure 1:
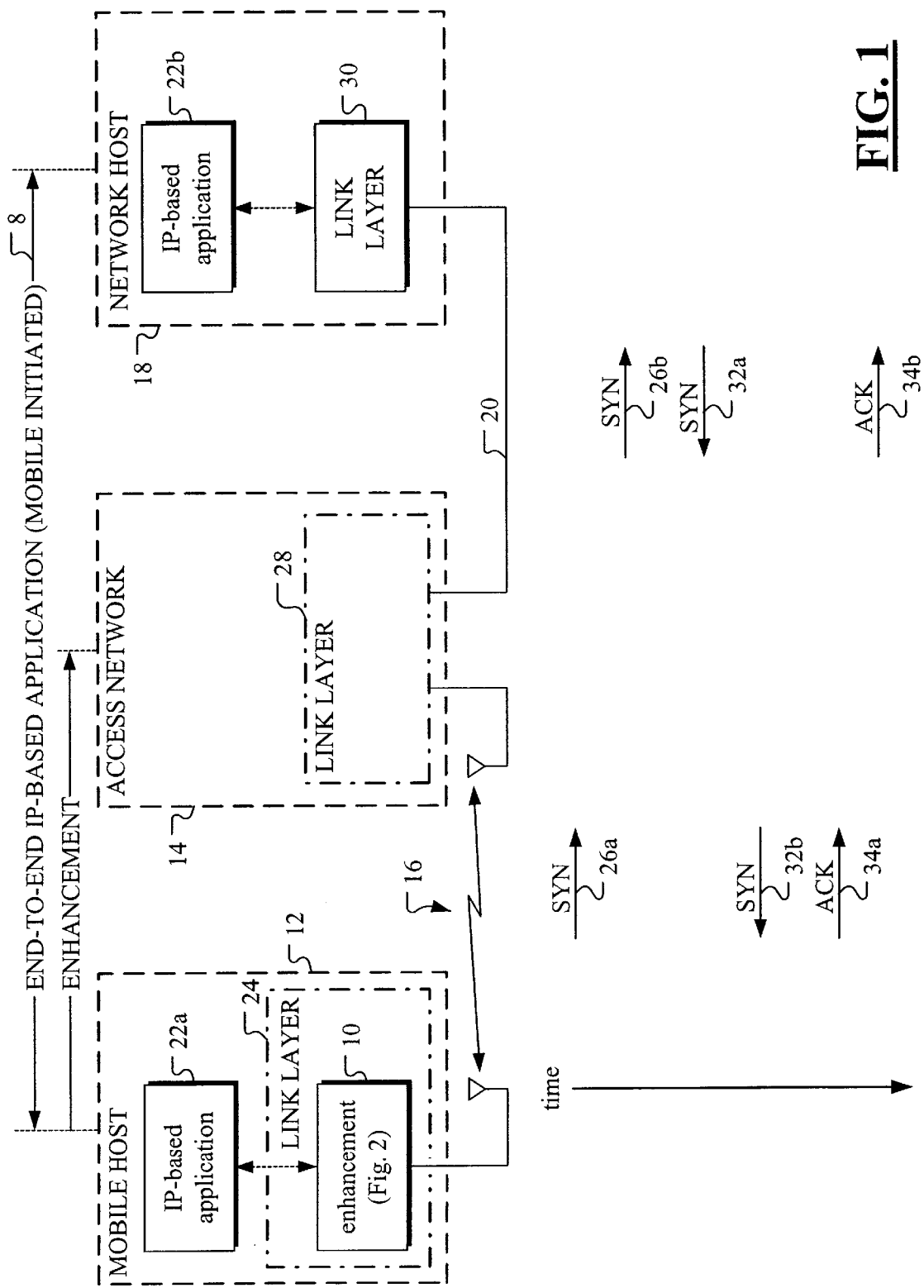
FIG. 1 shows a first embodiment of the present invention applicable to a mobile-initiated end-to-end application which may, for instance, be internet protocol (IP)-based.

FIG. 1 shows an embodiment of the present invention applicable to a mobile initiated end-to-end application 8 which may, for instance, be IP-based. It should be realized, however, that it may be based on some other protocol besides IP. An enhancement 10, according to the present invention, shown in FIG. 1 may reside in a mobile host 12 or terminal in communication with an access network 14 via a wireless link 16 forming part of the end-to-end IP-based application 8 between the mobile host 12 and a network host 18 or terminal. The access network 14 is connected to the network host 18 by means of a generalized network connection 20 which may go through several network elements such as routers in a wired or wireless network or some combination thereof. The end-to-end application 8 is therefore transported over links 16, 20 which altogether connect the ends of the application. The mobile host includes an IP-based application 22a which has a mirror-image 22b in the network host 18. The end-to-end IP-based application 8 that is set up between the mobile host 12 and the network host 18 and in the embodiment of FIG. 1 is initiated by the mobile host 12. The present invention enhances the reliability of the wireless portion 16 of the end-to-end IP-based connection comprising both the wireless link 16 and some other unspecified link 20 which may be wired, wireless or some combination thereof. The enhancement is to improve the reliability of the wireless portion 16 by, among other things, giving special treatment to selected packets at the link layer. Since wireless links are subject to far greater errors than wired links, it is necessary to take some special precautions and corrective actions in order to make such wireless links effectively useable in IP-based applications, as suggested above in the Background of the Invention section.

Rather than having a split-connection approach for which two separate interactions are created at the transport layer, the present invention takes the approach of enhancing the link layer at the sending end of the mobile link. For instance, in the embodiment of FIG. 1, the enhancement 10 resides in a link layer 24 of the mobile host 12. The IP-based application 22a is in communication with the link layer 24 either directly or via some intermediate layer or layers such as a transport layer and an internet layer e.g., TCP/IP. Or, the application 22a could be a transport layer application such as TCP. It will therefore be understood that the enhancement of the present invention is for use in a packet-based communication between two end points in a communication network in which a plurality of packets are communicated at least in part over a wireless link such as the wireless link 16 of FIG. 1. The enhancement identifies or recognizes a packet among the plurality of packets as a special or critical packet at a sending end point of the wireless link and applies special treatment to the special packet at the end point to ensure reliable transmission of the special packet over the wireless link 16.

In contrast, according to the prior art, what typically would happen without the above enhancement would be that a mobile terminal would seek for instance by means of a web browser to fetch a web page, say from Yahoo. The IP-based application 22a would initiate a connection request, e.g., to the transport layer and, in response to this, the transport layer would generate a packet such as a TCP packet, set a SYN flag in the TCP packet and hand it over to the internet layer e.g., the IP layer. The IP layer in turn would forward it to the link layer such as the RLC/MAC layer in the mobile host 12 which would finally forward this SYN packet to the access network 14. In this scenario, the RLC/MAC layer would not differentiate whether the packet received from the IP layer be an important packet like the TCP SYN packet or some other pedestrian UDP packet. Therefore, the chances of SYN packets getting lost would be very high in this case. A lost SYN packet adds a lot of delay in connection setup and is therefore very annoying to the user. So clearly, there is a need to ensure reliable transmission of these critical messages (in a wire line network packets are very seldom dropped so this is not a problem in wired networks).

According to the present invention, before sending a critical packet such as an SYN packet 26a, the link layer 24 is informed e.g. by the TCP layer that it is going to send a critical or special message. In the case of TCP, the RLC/MAC link layer could be informed of this fact by using the attributes of TCP listed below:

1. Source port;
2. Destination port;
3. Source IP address;
4. Destination IP address; and
5. Sequence number.

Since every transport layer protocol has at least one set of unique identifiers, informing the RLC/MAC about critical transport layer messages is not an issue. The way this information can be given is dependent on the implementation, but suffice it to say that it would be easy for a person of skill in the art to carry out. When RLC/MAC of the link layer 24 receives a packet with these attributes, it makes sure that under no circumstances these packets are dropped on the link 16. One way to ensure reliability is to keep retransmitting these packets over the link 16 until the access network 14 acknowledges that it has correctly received it. Please note that retransmissions take additional time and therefore it is not wise to give the same treatment to all the packets since that will make the entire process very, very slow. Another example of special treatment is an appropriate scheduling of these critical messages. In many cases, due to severe resource constraints in cellular environment, a critical packet might get delayed or dropped since all the resources were already allocated to, say, a burst of non-critical data. Under these circumstances, it is beneficial to reschedule, delay, or drop less critical data in an appropriate manner such that resource constraints have a very minimal effect on critical data.

Please note the attributes mentioned above make it possible for the application to enforce special treatment of data packets also. For example, in case of short-lived connections, as frequently encountered in case of web page download, a mobile sender might choose to send all its packets as special packets. Please also note that in some cases the base station might make use of certain additional parameters, e.g., the differentiated quality of service code points indicating a special treatment. These code points might be useful in those cases where there is no implicit or explicit way to indicate that certain packets are more important than others. Therefore, the choice of identifiers and the mechanism used to signal and insure special treatment is not limited to the above parameters or the mechanism used.

To further elaborate on the foregoing TCP example, once the SYN packet 26a is received by a link layer 28 of the access network 14, it (SYN 26b) is provided on the connection 20 to a link layer 30 of the network host 18 and upwards through its protocol stack to the end-point of the IP-based application 22b. In response, the network host sends a SYN 32a back to the other end via one or more routers over the link 20 to the link layer 28 in the access network 14 and from there the second step of the handshake SYN 32b is sent by the access network 14 over the wireless link 16 to the link layer 24 of the mobile host 12. It is conveyed from the link layer 24 to the IP-based application 22a upwards through the TCP/IP protocol stack of the mobile host.

To conclude the three-way handshake, the link layer 24 of the mobile host 12 sends an ACK signal 34a over the wireless link 16 to the link layer 28 of the access network 14. From there, the acknowledge message is sent as an ACK signal 34b over the connection 20 to the link layer 30 of the network host 18.

According to the present invention all of the signals SYN 26a, SYN 32b and ACK 34a transmitted over the wireless link 16 by the mobile host 12 are treated specially because they are critical messages for which reliable transmission must be ensured to enable the IP-based application to survive properly in the end-to-end application 8 in which at least a part comprises a wireless link 16.

Figure 2:
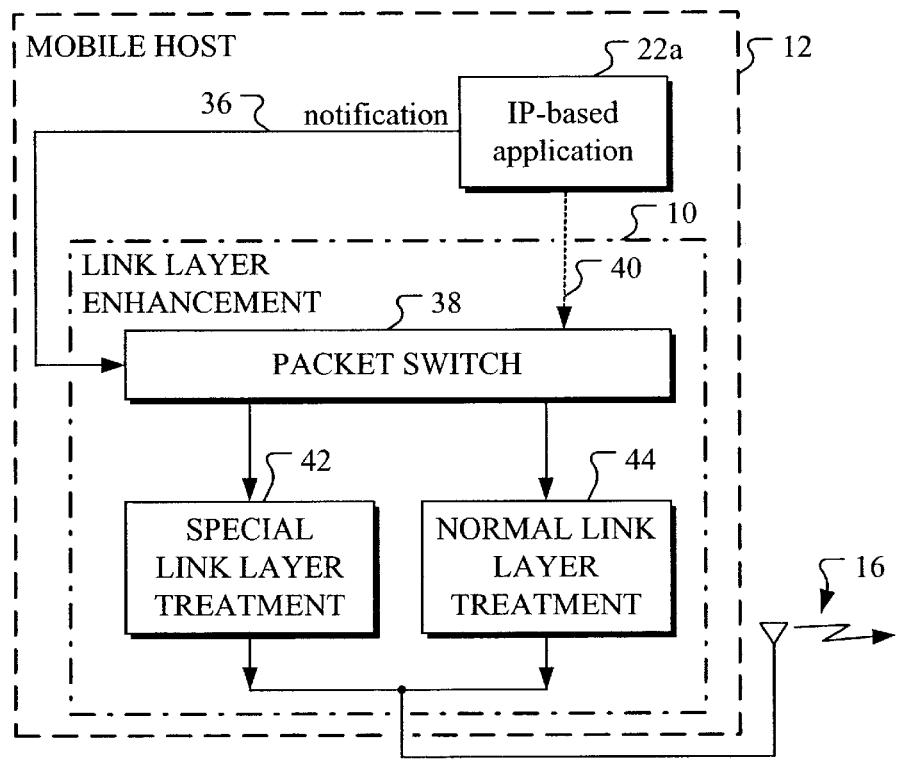
FIG. 2 shows details of the enhancement provided according to the present invention to the link layer of the mobile host of FIG. 1.

Referring now to FIG. 2, the link layer enhancement 10 of FIG. 1 is shown in more detail. Upon sending a special or critical packet such as a SYN signal 26a, the IP-based application 22a provides a notification to the link layer enhancement 10 by way for instance of a notification signal on a line 36 to a means 38 for discriminating special or critical packets from ordinary packets. Such may for instance be a packet switch 38 responsive to the plurality of packets 40 from the IP-based application 22a. The means for discriminating 38 is able to determine which of the packets among the plurality of packets on the line 40 are special or critical by some mechanism such as the notification signal on the line 36. The packet switch 38 illustrates this concept by routing these special or critical packets to a special link layer treatment mechanism 42 rather than a normal link layer treatment mechanism 44 to which all of the ordinary packets are routed. The link level special treatment carried out by the mechanism shown by the block 42 may include for instance verifying correct reception and retransmitting if needed, forward error correction, stronger error protection coding, etc. The specifics depend on the link technology and may be selected by any person of skill in the art depending on the implementation. The main point is that the reliability of the transmission of these special or critical packets is enhanced according to the present invention at the link layer, as shown, by special link layer treatment of these packets. It is important to note that the remaining packets which are not special and not critical are treated normally by the normal link layer treatment procedure 44.

Figure 3:
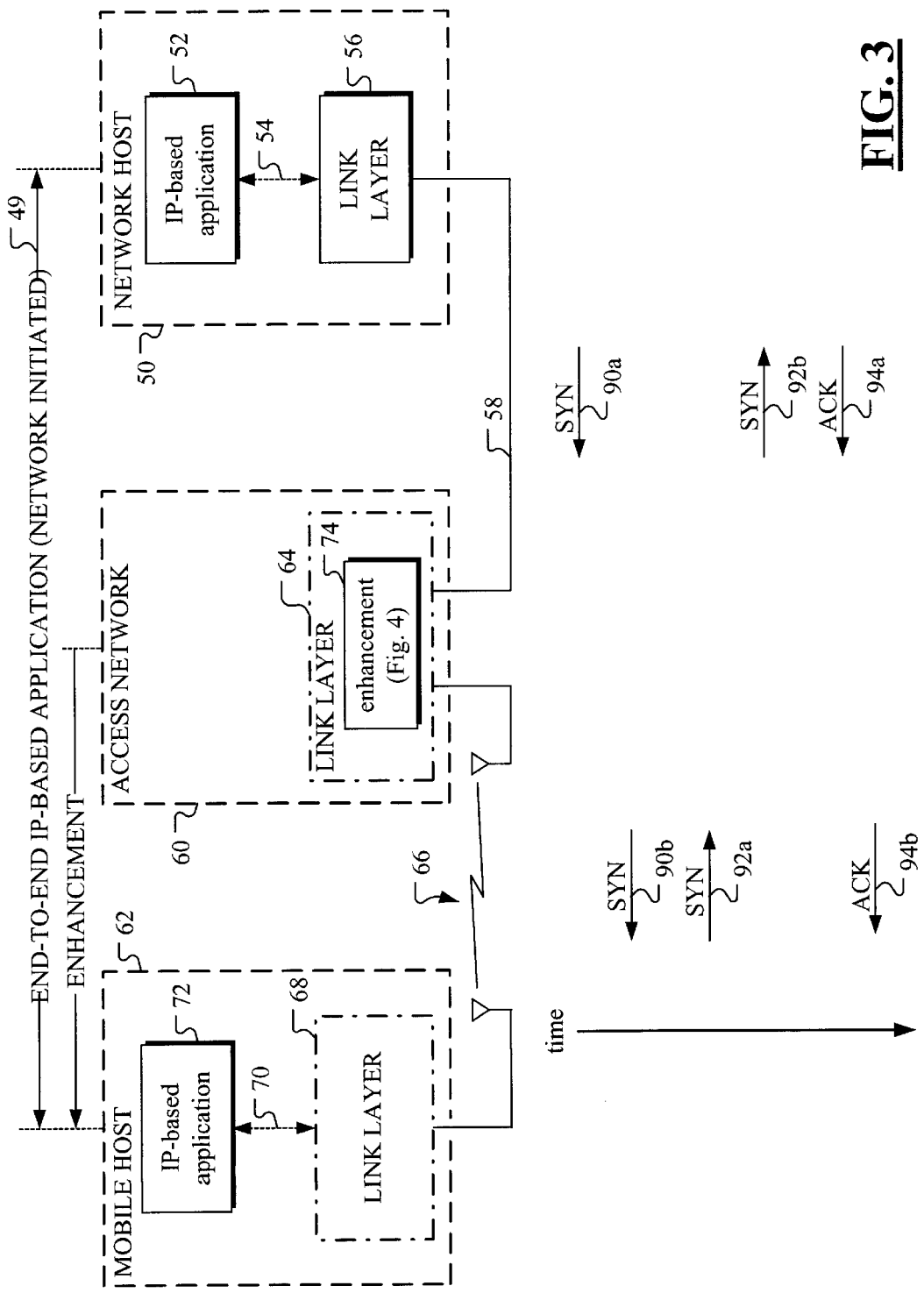
FIG. 3 shows a second embodiment of the present invention applicable to a network-initiated end-to-end application which may, for instance, be IP-based.

FIG. 3 shows a second embodiment of the present invention, in which an end-to-end IP-based application 49 is initiated at the network side by a network host 50. An IP-based application 52 provides a plurality of packets through various layers of a protocol stack to a link layer 56 which transmits the plurality of packets on a connection link 58 through a network (which may be a wired network) to an access network 60, which may provide wireless links to various mobile hosts. A mobile host 62 is shown in FIG. 3 as the intended recipient of the plurality of packets from the network host 50. In the case of the prior art, the link layer 64 of the access network would simply forward the plurality of packets received on the line 58 to a radio link 66 between the intended mobile host 62 and the access network 60. A link layer 68 within the mobile host 62 would then forward the plurality of packets upwards through the protocol stack of the mobile host (as shown on a line 70) to the end point of the IP-based application 72. However, as pointed out above, the wireless link 66 is effectively a "weak link" in the chain of communication of the plurality of packets from end-to-end 49 in this IP-based application initiated by the network host 50. This weak link 66 can be particularly detrimental in the case of selected important, special or critical packets, such as the packets exchanged during the establishment of a TCP connection, the closing of a TCP connection, or the like.

According to the second embodiment of the present invention, an enhancement 74 is made to the link layer 64 of the access network so as to enhance the probability of the plurality of packets provided by the network host 50 in getting through to the mobile host 62 in a reliable manner. Suppose that the mobile terminal hosts a web-page, for instance, in a hypothetical case, an e-commerce business is started but the proprietor keeps the company web-page on a laptop which has wireless access. In this case, according to the present invention, it is the access network 60 that should ensure the reliability of the special or critical messages.

Figure 4:
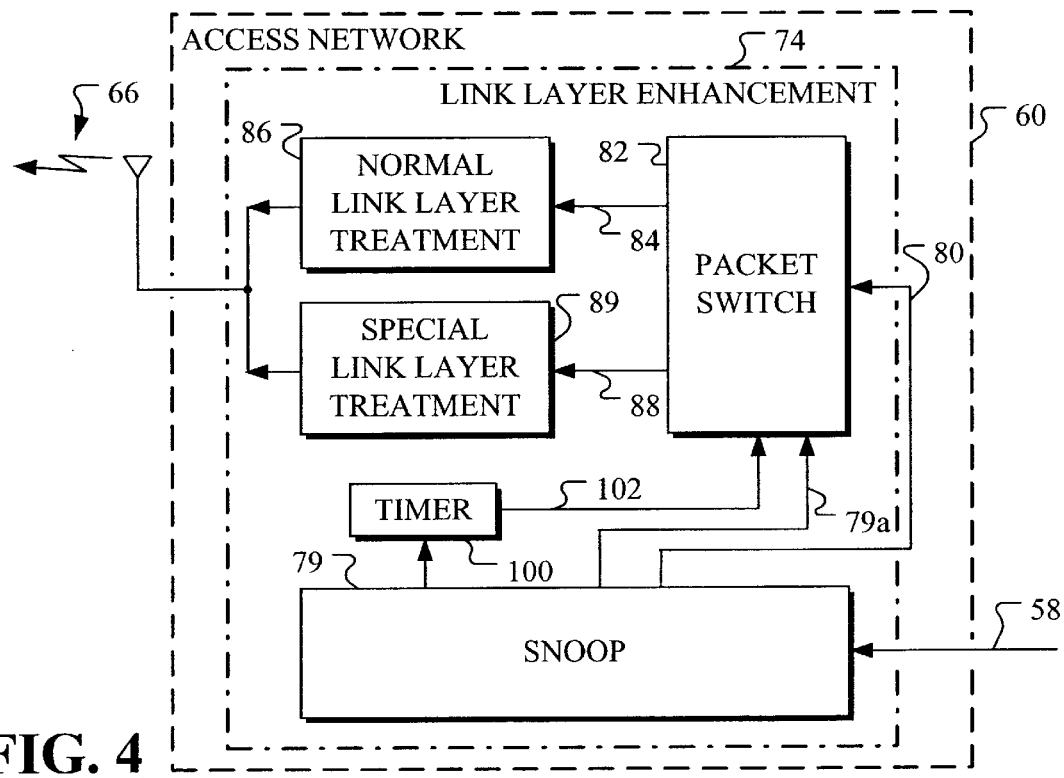
FIG. 4 shows details of an enhancement made to the link layer of the access network of FIG. 3, according to the present invention.

Referring now to FIG. 4, one way for the access network 60 to make this possible is by looking inside the TCP packet to see if the SYN flag is set or unset in the packet. This is shown in FIG. 4 by means of a "snoop" device 79 which is responsive to the packets incoming from the network host 50 on the line 58 for looking inside (inspecting) the TCP packet to see if the SYN flag is set or unset in the packet. If it is set, that means that the packet is a critical packet containing a critical message and requires special treatment, it is identified or recognized as such by the snoop device, and a switch signal is provided on a line 79a. Consequently, although most of the incoming packets that are routed on a line 80 to a packet switch 82 are routed on a line 84 for normal link layer treatment in a block 86, some of them, i.e., the special or critical packets, are routed on a line 88 by the packet switch to a block 89 where special link layer treatment of these special packets is carried out. When the switch signal is asserted on the line 79a, the packet switch routes the packet on the line 80 to the block 89 via the signal line 88. The special link layer treatment effected in the block 89 may comprise, for instance, relentless transmission until it is sure that the special or critical packet makes it through the radio link 66 to the mobile host 62.

Figure 5:
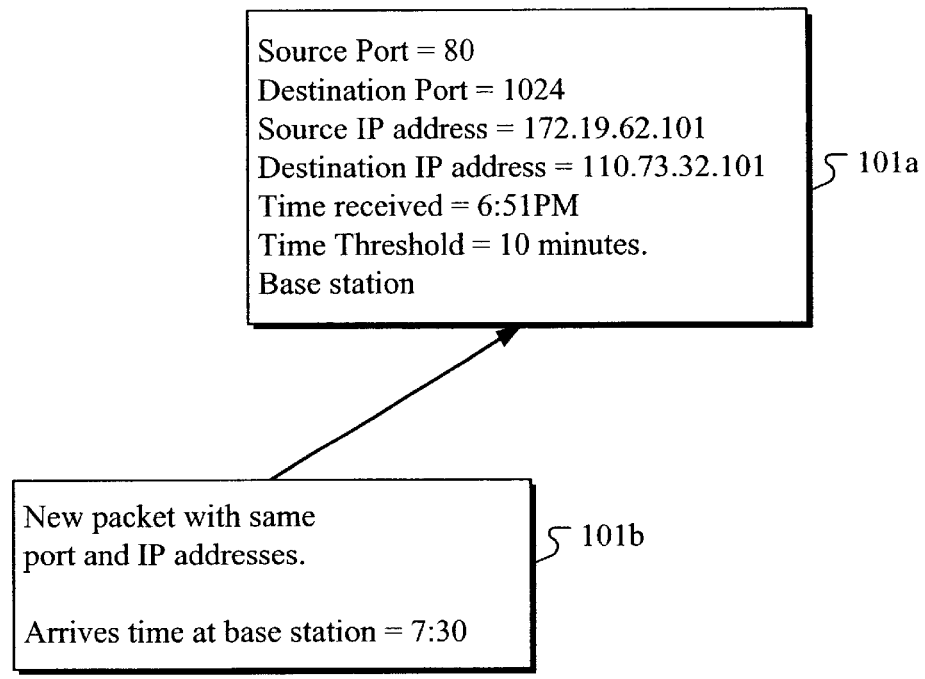
FIG. 5 shows how an accumulated acknowledgement may be discerned by the snoop device of FIG. 4.

Referring back to the lower part of FIG. 3, a signaling sequence is there shown for establishing a TCP connection between the network host 50 and the mobile host 62. As in FIG. 1, the TCP uses a three-way handshake to establish the connection. The network host 50 begins by sending a SYN with a statement that it chooses to use a particular value of a sequence number. The value is typically associated with the system clock time to reduce the likelihood that sequence numbers from a previous establishment are picked up after a restart. The mobile host 62 acknowledges by returning a SYN 92a, 92b, acknowledging the sequence number and a statement that it chooses to use another sequence number for data transmission. The handshake is completed when the network host 50 acknowledges the sequence number used by the mobile host with an acknowledge signal 94a, 94b. Once the three-way handshake is over, the receiver sends acknowledgements for incoming data packets every once in a while. Unfortunately, such an acknowledgement signal can arrive after a very long time, e.g., because it is an aggregated ACK for some large number of previous data packets so that the TCP peer had to wait many times the normal value to make this possible. Since TCP is a timer-based protocol, if the time gap between two consecutive packets is larger than a certain period, it implicitly implies that the packet is of high importance. (Unfortunately, there is no flag-like SYN in the TCP packet that could indicate these time-critical ACK packets.) To deal with these, according to the present invention, the access network link layer enhancement 74 keeps, e.g., the pentlet (source port, destination port, source IP address, destination IP address and sequence number) described above, but for instance except for keeping the sequence number, it keeps the time when it receives the ACK packet 94a. When a new ACK packet arrives with the same source port, destination port, source IP address and destination IP address, it compares the time difference between the previous packet and the new packet, and if this time exceeds some threshold value, that implies that the message is critical and needs special treatment. A timer 100 is shown in FIG. 4 for this purpose. The diagram of FIG. 5 shows an example of this concept in further detail. In the upper part 101a of FIG. 5, the time received has been noted, and a time threshold of 10 minutes assigned. The times illustrated have been exaggerated for purposes of illustration only. In the lower part 101b of the drawing, a new packet is shown as arriving with the same port and IP addresses, but it is shown arriving approximately 39 minutes later from the previous one. Since the packet arrives after 39 minutes from the previous one and the timer 100 threshold is only 10 minutes, the access network will give it special treatment, as signaled on a line 102 to the packet switch 82 so that it can be handled in the special link layer treatment block 89.

Figure 6:
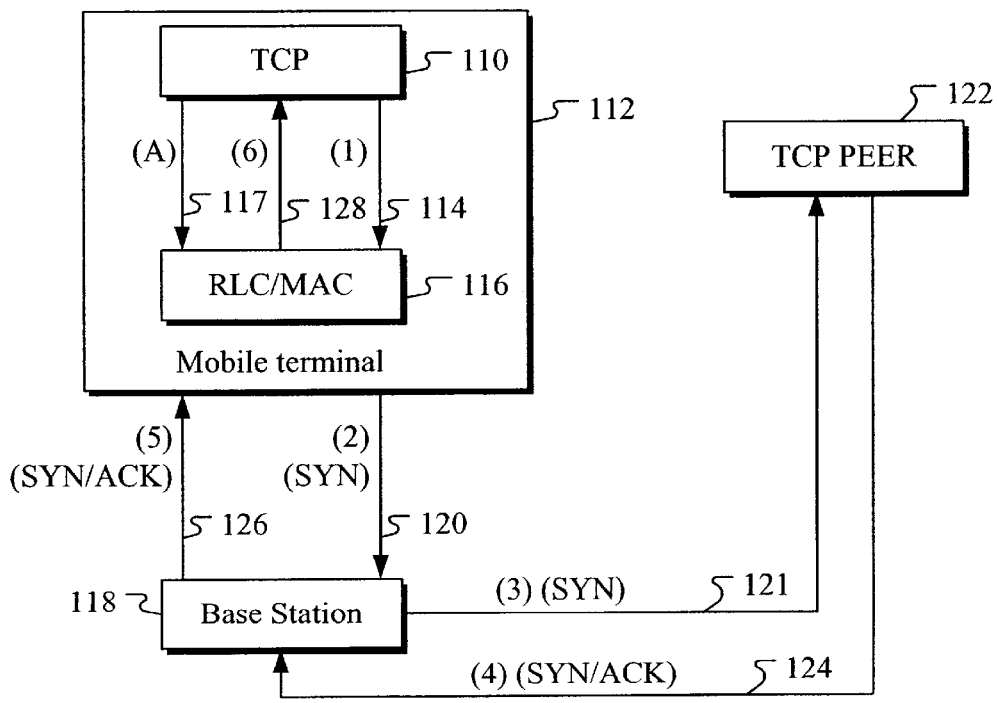
FIG. 6 shows the embodiments of FIGS. 1 and 3 shown in a single, unified figure, as applied to the TCP/IP protocol.

Referring now to FIG. 6, the embodiments of FIGS. 1 and 3 are shown in a single, unified figure, as applied to the TCP/IP protocol. In FIG. 6, the TCP layer 110 of a mobile terminal 112 is shown (1) sending an SYN signal on a line 114 (or any critical message, for that matter) to the link layer 116. The fact that this is a critical message is signaled (A) through the signaling shown as a signal on a line 117 in the figure. The RLC/MAC layer 116 ensures through retransmissions (2) that this message goes through to the base station 118, as shown by a signal on a line 120. As a third step, the RLC/MAC layer of the base station relays (3) the message to the peer TCP through normal routing mechanisms of IP, as shown by a signal on a line 121. In a fourth step, the TCP peer 122 responds (4) to this critical message in a certain way, e.g., by sending an ACK on a line 124 or by sending an SYN/ACK depending on the data being sent. At this point the TCP layer at the base station 118 snoops (5) into the packet and realizes that it is a critical message. Any message with the SYN flag set is critical. Any ACK packet that arrives after a long delay from the previous ACK is critical. By snooping into the packet the base station 118 can determine when the message is critical. It gives special treatment to such messages and ensures that these messages make it through to the mobile station 112. The RLC/MAC layer in the base station 118 forwards this message with special treatment to the TCP layer 110 of the mobile terminal 112 through normal methods, as signified by a signal on a line 126 and by a line 128.

Note, if the entity shown as TCP peer 122 initiates the connection (also referred to as mobile terminated, then the sequence of data is 4, 5, 6, 1 and A, 2 and 3. Other than that, there is no difference. It should also be noted that the base station snoops into the TPC packet, which has certain bits reserved for flag like SYN and ACK, and based on this the base station can figure out if the message is critical. See, for instance, Table 4.1 entitled "Code Bit Field Definitions" on page 178 of "TCP/IP Protocol Suite" by Floyd Wilder, $2^{nd}$ edition, Artech House 1998.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. Method for use in a packet-based communication between two end points (12, 18; 50, 62) in a communication network during which a plurality of packets are communicated at least in part over a wireless link (16; 66) with reliable transmission provided by layer of said end points above a link layer, characterized by
    identifying (36) or recognizing (79a) a packet as a special packet at an end point (12, 14, 60, 62) of said wireless link, and by
    applying special treatment (42; 89) to said special packet at a link layer of said end point of said wireless link to ensure said reliable transmission is enhanced for said special packet over said wireless link and with said reliable transmission otherwise provided normally by said layer above the link layer to said plurality of packets, without said link layer enhancement.

2. The method of claim 1, characterized by said end point of said wireless link comprising a sending endpoint (12; 60) for sending said plurality of packets over said wireless link (16; 66).

3. The method of claim 1, characterized by said identifying or recognizing comprising identifying said special packet at an application layer (22a) of said endpoint (12) and by notifying (36) said link layer (10) of said endpoint for applying said special treatment (42) to said identified special packet at said link layer.

4. Method for use in a packet-based communication between two end points (12, 18; 50, 62) in a communication network during which a plurality of packets are communicated at least in part over a wireless link (16; 66), characterized by
    identifying (36) or recognizing (79a) a packet as a special packet at an end point (12, 14, 60, 62) of said wireless link, by
    applying special treatment (42; 89) to said special packet at said end point of said wireless link to ensure reliable transmission over said wireless link, said identifying or recognizing comprising recognizing (79) said special packet at a link layer (74) of said endpoint (60) and by controlling (79a) said link layer of said endpoint for applying said special treatment (89) to said special packet at said link layer, and said identifying or recognizing comprising identifying or recognizing said special packet by timing arrivals of packets having a same characteristic code associated therewith and identifying or recognizing a packet having said code arriving a selected period after arrival of last packet having said code as said special packet.

5. Device for use in a packet-based communication between two end points (12, 18; 50, 62) in a communication network during which a plurality of packets are communicated at least in part over a wireless link (16; 66) with reliable transmission normally provided by transport layers of said end points, characterized by
    means (22a; 79) for identifying or recognizing a packet as a special packet at an end point (12, 14, 60, 62) of said wireless link, and by
    means (42; 89) for applying special treatment to said special packet at a link layer of said end point of said wireless link to ensure said reliable transmission is enhanced for said special packet over said wireless link and with said reliable transmission otherwise provided normally by said transport layers to said plurality of packets without said link layer enhancement.

6. The device of claim 5, characterized by said end point of said wireless link comprising a sending endpoint (12; 60) for sending said plurality of packets over said wireless link (16; 66).

7. The device of claim 5, characterized by said identifying or recognizing comprising identifying said special packet at an application layer (22a) of said endpoint (12) and by notifying (36) said link layer (10) of said endpoint for applying said special treatment (42) to said identified special packet at said link layer.

8. Device for use in a packet-based communication between two end points (12, 18; 50, 62) in a communication network during which a plurality of packets are communicated at least in part over a wireless link (16; 66), characterized by
    means (22a; 79) for identifying or recognizing a packet as a special packet at an end point (12, 14, 60, 62) of said wireless link, and by
    means (42; 89) for applying special treatment to said special packet at said end point of said wireless link to ensure reliable transmission over said wireless link,
    wherein said identifying or recognizing comprises recognizing (79) said special packet at a link layer (74) of said endpoint (60) and for controlling (79a) said link layer of said endpoint to apply said special treatment (89) to said special packet at said link layer, wherein said recognizing comprises recognizing said special packet by timing arrivals of packets having a same characteristic code associated therewith and identifying a packet having said code arriving a selected period after arrival of a last packet having said code as said special packet.

9. System having a pair of hosts (12, 18; 62, 50) communicating packets in an end-to-end application (8; 49) over communication links (16, 20; 66, 58) including a wireless link (16; 66) with reliable transmission of said packets provided end-to-end by transport layers of said hosts, said wireless link having a mobile host (12; 62) at one end and an access network (14; 60) at another end, characterized by an enhancement (10; 74) in a link layer (24; 64) at an end of said wireless link for providing special link layer treatment (42; 89) to a packet identified as a special packet for ensuring said reliable transmission is enhanced for said special packet over said wireless link and with said reliable transmission otherwise provided normally end-to-end by said transport layers to said packets, without said link layer enhancement.

10. The system of claim 9, characterized by said application (22a) identifying said special packet as special to said link layer when providing the special treatment (42) at an end (12) of said wireless link (16) co-located with said application.

11. The system of claim 9, characterized by said link layer inspecting said packets for identifying said special packet when said link layer is providing said special treatment (89) at an end (60) of said wireless link (66) not co-located with said application.

12. The system of claim 9, wherein said enhancement (10; 74) is characterized by means (22a; 79) for identifying or recognizing said special packet at an end of said wireless link, and by means (42; 89) for applying said special link layer treatment to said special packet at said end of said wireless link.

13. The system of claim 12, characterized by said end of said wireless link comprising a sending end (12; 60) for sending said packets over said wireless link (16; 66).

14. The system of claim 12, characterized by said special link layer treatment applied at a sending end of said wireless link.

* * * * *